US012602407B2

(12) United States Patent
Maddah et al.

(10) Patent No.:  US 12,602,407 B2
(45) Date of Patent:      Apr. 14, 2026

(54) SYSTEMS AND METHODS FOR GENERATING A UNIQUE IDENTITY FOR A GEOSPATIAL OBJECT CODE BY PROCESSING GEOSPATIAL DATA

(71) Applicant: Swiss Reinsurance Company Ltd., Zürich (CH)

(72) Inventors: Nariman Maddah, Horgen (CH); Alicia Montoya, Zürich (CH); Antonio Savona, London (GB); Martin Spörri, Zürich (CH)

(73) Assignee: Swiss Reinsurance Company Ltd., Zürich (CH)

( * ) Notice: Subject to any disclaimer, the term of this patent is extended or adjusted under 35 U.S.C. 154(b) by 168 days.

(21) Appl. No.: 18/461,229

(22) Filed: Sep. 5, 2023

(65) Prior Publication Data

US 2024/0070173 A1      Feb. 29, 2024

Related U.S. Application Data

(63) Continuation of application No. PCT/EP2023/064021, filed on May 25, 2023.

(30) Foreign Application Priority Data

May 27, 2022     (CH) ............................... 000643/2022

(51) Int. Cl.
G06F 16/909      (2019.01)
G06F 16/29       (2019.01)
G06T 17/05       (2011.01)

(52) U.S. Cl.
CPC .............. G06F 16/29 (2019.01); G06T 17/05 (2013.01)

(58) Field of Classification Search
CPC ........ G06F 16/29; G06F 16/909; G06T 17/05
See application file for complete search history.

(56) References Cited

U.S. PATENT DOCUMENTS 6,985,929 B1 *   1/2006   Wilson .................... G06F 16/29
                                                              709/219
11,361,247 B2 *  6/2022   Wolfson ............... G06F 16/285
12,061,879 B1 *  8/2024   Janzen ................. G06Q 40/12
                     (Continued)

Primary Examiner — Xiao M Wu
Assistant Examiner — George Renze
(74) Attorney, Agent, or Firm — Oblon, McClelland, Maier & Neustadt, L.L.P.

(57)      ABSTRACT

A geospatial digital encoding, decoding, and mapping system and method for processing geospatial data to generate a unique geo identification (ID) code for a geospatial object distinctively identifying the geospatial object and for decoding and mapping a unique geo identification code (ID) to a digital representation. The system comprises a geospatial data processing unit for capturing geospatial data associated with a geospatial object, and for extracting a footprint of the geospatial object based on the geospatial data. The system comprises a boundary determination unit for identifying a centroid of the footprint and determining a relevant boundary for the footprint. The system further comprises geo ID code generation unit for determining an orientation of the boundary and rotating the boundary around the centroid of the footprint. The geo ID code generation unit computes directional extents of the boundary, and generates the geo ID code based on directional extents, centroid, and orientation of the boundary.

31 Claims, 7 Drawing Sheets

(56)  References Cited

U.S. PATENT DOCUMENTS

| | | | |
|---|---|---|---|
| 2009/0313277 A1* | 12/2009 | Rissman | G06F 16/29 |
| 2013/0202197 A1* | 8/2013 | Reeler | G06T 7/20 |
| | | | 382/154 |
| 2019/0205355 A1* | 7/2019 | Moore | G01C 21/3667 |
| 2020/0279170 A1* | 9/2020 | Huang | G01C 21/3889 |
| 2020/0314589 A1* | 10/2020 | Sheng | H04W 4/021 |
| 2021/0021423 A1* | 1/2021 | Latorre | G06Q 10/10 |
| 2021/0133291 A1* | 5/2021 | Shapiro | G06F 16/909 |
| 2022/0207796 A1* | 6/2022 | Bowdler | G06T 7/11 |

* cited by examiner

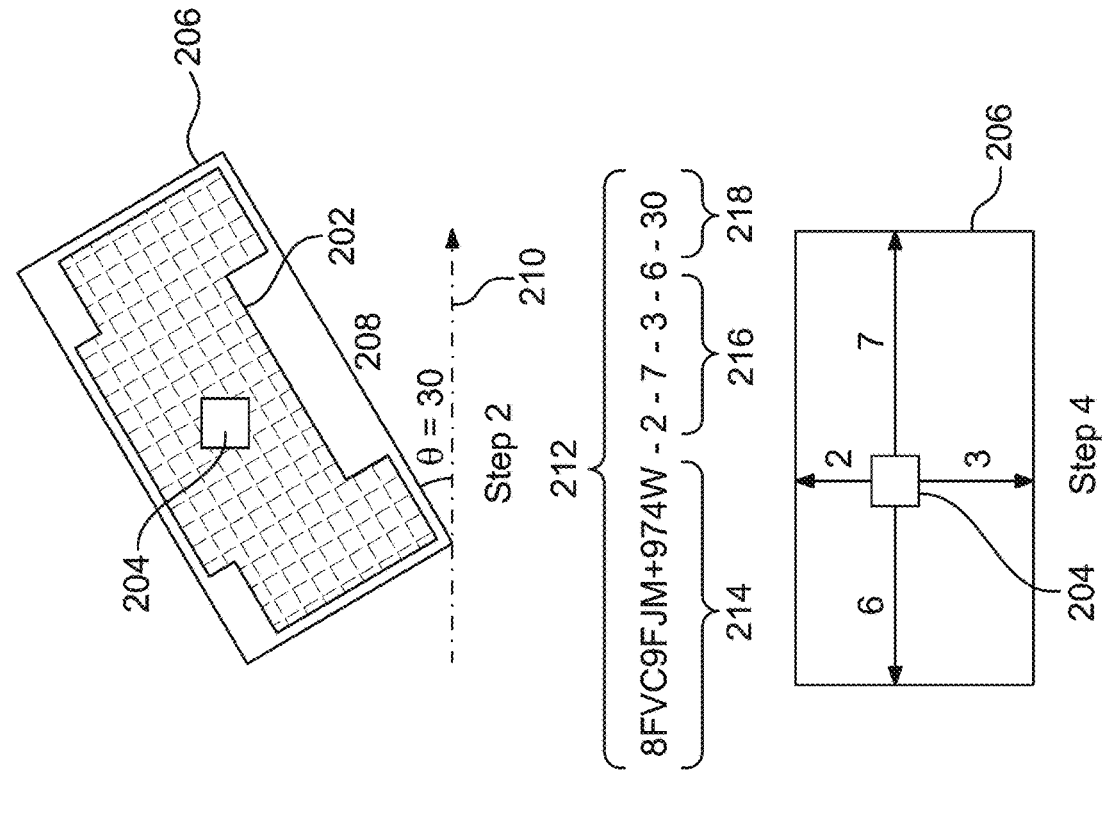
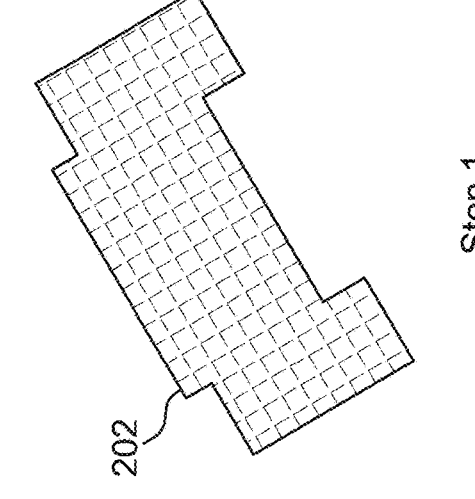
Step 1
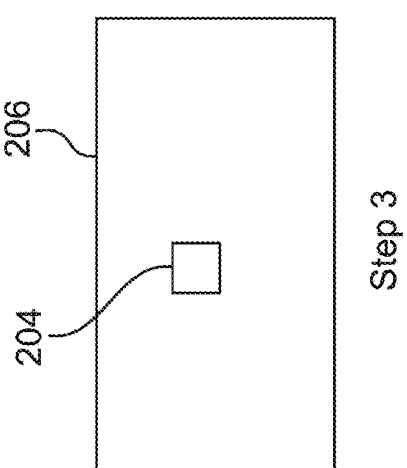
Step 3
Fig. 2

300
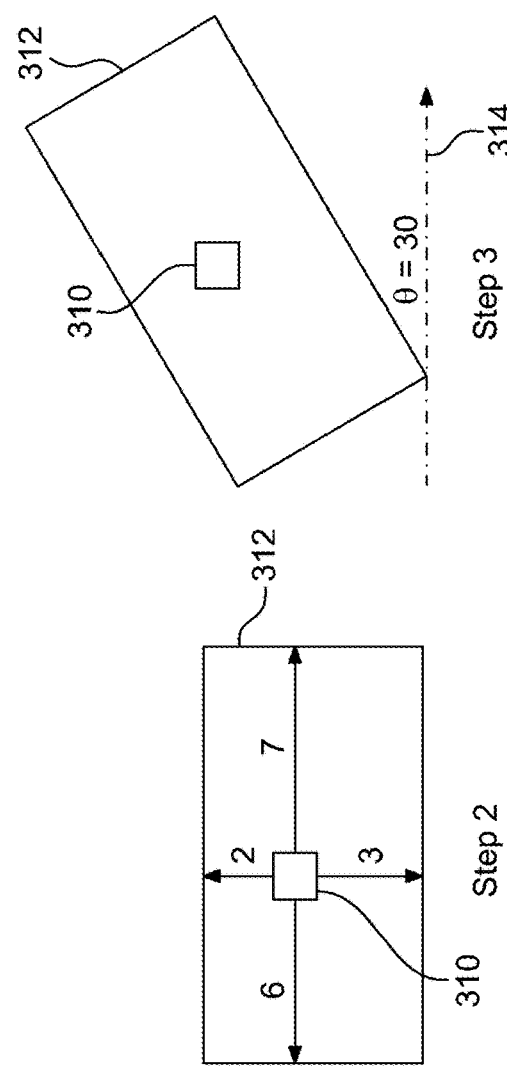
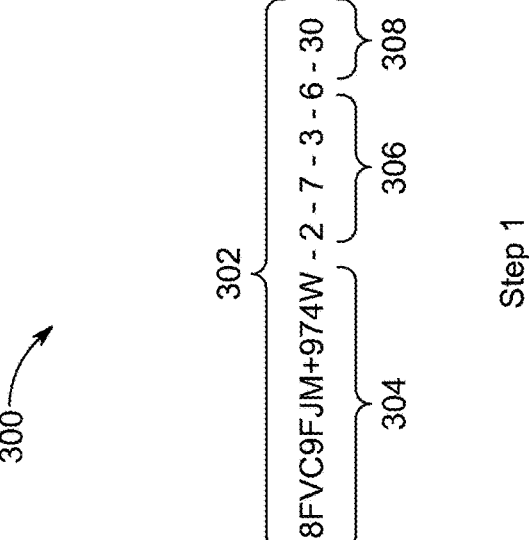
Fig. 3

400

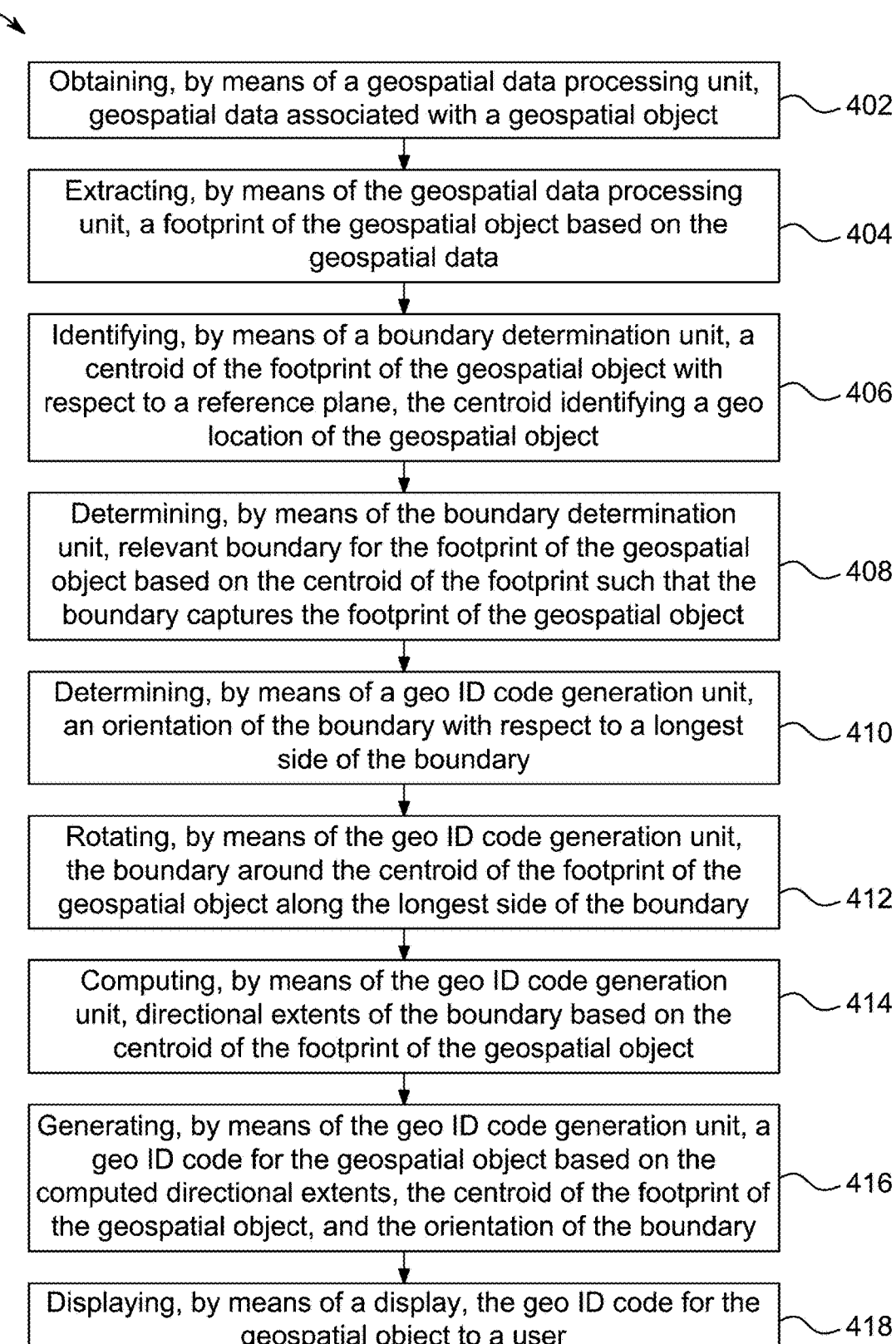

Obtaining, by means of a geospatial data processing unit, geospatial data associated with a geospatial object 402

Extracting, by means of the geospatial data processing unit, a footprint of the geospatial object based on the geospatial data 404

Identifying, by means of a boundary determination unit, a centroid of the footprint of the geospatial object with respect to a reference plane, the centroid identifying a geo location of the geospatial object 406

Determining, by means of the boundary determination unit, relevant boundary for the footprint of the geospatial object based on the centroid of the footprint such that the boundary captures the footprint of the geospatial object 408

Determining, by means of a geo ID code generation unit, an orientation of the boundary with respect to a longest side of the boundary 410

Rotating, by means of the geo ID code generation unit, the boundary around the centroid of the footprint of the geospatial object along the longest side of the boundary 412

Computing, by means of the geo ID code generation unit, directional extents of the boundary based on the centroid of the footprint of the geospatial object 414

Generating, by means of the geo ID code generation unit, a geo ID code for the geospatial object based on the computed directional extents, the centroid of the footprint of the geospatial object, and the orientation of the boundary 416

Displaying, by means of a display, the geo ID code for the geospatial object to a user 418

Fig. 4

$$IoU = \frac{Area\ of\ overlap}{Area\ of\ union}$$

$$IoA = \frac{Area\ of\ overlap}{min(Area\ 1,\ Area\ 2)}$$

SYSTEMS AND METHODS FOR GENERATING A UNIQUE IDENTITY FOR A GEOSPATIAL OBJECT CODE BY PROCESSING GEOSPATIAL DATA

CROSS-REFERENCE TO RELATED APPLICATIONS

This application is a continuation of and claims benefit under 35 U.S.C. § 120 to International Application No. PCT/EP2023/064021 filed on May 25, 2023, which is based upon and claims the benefit of priority from Swiss Application No. 000643/2022, filed May 27, 2022, the entire contents of each of which are incorporated herein by reference.

FIELD OF THE INVENTION

The present invention relates to systems and methods for processing geospatial data. According to an aspect, the systems and methods generate a geo identification (ID) code for a geospatial object based on processing the geospatial data, such that the geo ID code distinctly identifies the geospatial object. In an aspect, the systems and methods generate the geo ID code for the geospatial object based on an orientation of the geospatial object. In addition, the present invention relates to systems and methods for processing a geo ID code to effectively identify a geospatial object.

BACKGROUND OF THE INVENTION

Location information is an integral part of the modern digital ecosystem and critical for unlocking economic, social, and environmental opportunities for sustainable growth and development of countries. Further, location information is also critical to the success of modern industry offering location-based services such as e-commerce, delivery and logistics, and urban transport. Location information is also essential for more traditional sectors of the economy such as agriculture, and construction and development of infrastructures. Geospatial data which includes location information may be data about geographical locations of geospatial objects such as buildings, facilities, infrastructure, etc. and provide vital information about the geospatial objects. Geospatial data has a vast number of applications. Geospatial data can be used in web-based navigation maps that people can use for everyday navigation purposes. Geospatial data can also be used for urban planning. For example, new sites can be identified for further development.

There has been immense progress over the years in technology to capture of geospatial data through ground-based survey techniques, photogrammetry using manned/unmanned aerial vehicles, terrestrial vehicle mounted mobile mapping systems, light detection and ranging (LIDAR), radio detection and ranging (RADAR) interferometry, satellite-based remote sensing, mobile phone sensors, and other techniques. Accordingly, the geospatial data is obtained from disparate sources. Further, geospatial data may include diverse datasets. However, these diverse datasets lack a common identifier to match and relate the geospatial objects.

In an example, buildings may be conceived as locations, and therefore are identified with a street address or with a single geographic coordinate point (latitude and longitude). However, an address-based system is insufficient to uniquely identify buildings, and to append and merge data from the disparate sources due to address name duplicates, incorrect entries, and lack of an input format standard. Without accurate location information, building owners, utilities, cities, energy service companies, and decision-makers cannot easily match data to the right building, and identify a location. Difficulty in joining data from disparate sources, due to the different ways of identifying buildings using addresses or local numbering systems has become a major obstacle to information and knowledge exchange. Further, the lack of a standardized way to identify buildings makes it difficult to accurately associate data with a specific facility, creating a barrier to effective asset management, exchange of data in the risk-transfer technology as e.g. between insureds, re/insurers and brokers, research, and analysis. Thus, there is a need for a system that can facilitate in unique identification of geospatial objects.

SUMMARY OF THE INVENTION

It is an object of the invention to provide an automated digital system enabled for generating by encoding of geo-data a unique identification of geospatial objects, and for generating a rotated graphical multi-dimensional digital and unique representation, such as an encoded geo ID, representing the original geospatial object. The digital representation should allow an easy technical handling and further should be transferable easily cross-platforms and standards. Further, the digital representation should be fine-tunable and adaptable for technical requirements, as precision, resolution etc.

According to the present invention, these objects are achieved particularly through the features of the independent claims. In addition, further advantageous embodiments follow from the dependent claims and the description.

According to the present invention, the abovementioned objects are particularly achieved by inventive electronic system for processing, encoding geospatial data and decoding unique geo identifier where during encoding a unique geo identification (ID) code is generated for a geospatial object distinctively identifying the geospatial object. During decoding, a geo ID as an input is captured, the geo ID is checked for validity, and if so the rotated polygon, as e.g. a rotated rectangle, is generated digitally representing the originally encoded geospatial object. Further, during decoding, a matching structure generates one to one, one to many or many to many matches of geo IDs from data sources of the system, without the original geospatial object. More particularly, the abovementioned objects are achieved by the inventive system and method for processing and encoding of geospatial data, and decoding and matching of a unique geo identifier of a geo-spatial object. In an example embodiment, a system for processing geospatial data to generate a unique geo identification (ID) code for a geospatial object to distinctively identify the geospatial object is disclosed. For decoding, the digital system can e.g. comprise a display for visually providing the geospatial object in response to receiving the unique geo ID code. From the geospatial data comprising e.g. vector data, as e.g. digital polygons, the digital system extracts or generates the geospatial objects, e.g. building footprints, where after a data cleaning processing step, a geo ID for each of the objects in generated by the system. Thus, the system includes a geospatial data processing unit for obtaining the geospatial data associated with the geospatial object and extracting a footprint of the geospatial object based on the geospatial data. The system also includes a boundary determination unit for identifying a centroid of the footprint of the geospatial object with respect to a reference plane, the centroid identifying a geo location of the geospatial object, and determining relevant boundary for the footprint of the geospatial object based on the centroid of the footprint such that the boundary captures the footprint of the geospatial object. Further, the system includes a geo ID code generation unit for determining an orientation of the boundary with respect to a longest side of the boundary, and rotating the boundary around the centroid of the footprint of the geospatial object along the longest side of the boundary. It is to be noted that it can also be realized by doing it e.g. along the shortest boundary. According to some embodiments, the boundary may be oriented at an angle between 0 degrees to 180 degrees relative to the longest side of the boundary, and with reference to the reference plane. The geo ID code generation unit further computes directional extents of the boundary based on the centroid of the footprint of the geospatial object, and generates the geo ID code for the geospatial object based on the computed directional extents, the centroid of the footprint of the geospatial object, and the orientation of the boundary. According to some embodiments, the geospatial object comprises a building, a land structure, an infrastructure or an installed equipment or similar objects that can be identified over a geospatial area. According to some embodiments, the geo ID code generation unit stores the geo ID code for the geospatial object in a geo ID code storage. It has to be noted that the present invention fundamental technical advantages over the prior art systems. Geo ID and quasi-geo ID encoding generally should not only represent the basic shape of an object but should also be a reference surface of the height system, its location and structure above ground. However, Geo ID and quasi-geo ID should consider the density distribution of objects in loco, since this can impose technical important constraints in topographical inversion. Topography, as understood herein, refers to the encoding (description) of the shape and position of objects on the earth's surface. Already before the development of GPS technology, prior art systems made use of leveling data as the boundary values to encode a (quasi) geo ID. Due to the unknown boundary and object density, the encoding of (quasi) geo ID had to face the complexity of the free boundary value problem and indeterminacy in approach and iterative computation. With the development of GPS technology, the coordinate of ground can be gained accurately, which allows the system to acquire a fixed boundary on which topographical encoding comprising sub-ground structures can be obtained. Consequently, using the ground surface as the boundary and topography on it as the boundary value, GPS/topography boundary value problem is built up and an asymptotical approach solution of it is used for encoding. The present invention provides a new approach on GPS/topography boundary value problem by allowing to encode/decode a geo ID for an area.

According to an embodiment variant, the system 100 further comprises a digital geo ID decoder for decoding a received geo ID, wherein a geo ID is received as an input, for example from a user device over a data transmission network. The geo ID is validated and a digital representation is generated digitally representing the originally encoded geospatial object. The digital representation can e.g. be realized as a rotated two or three dimensional polygon. The rotated polygon can e.g. be realized as a rotated digital rectangle. For the decoding the system has, inter alia, the advantage that the system can re-create the best rotated rectangle for the given geo ID. So, a user sends a geo ID and the system returns a geospatial object representing the best rotated rectangle. Further, the system allows to fine-tune the accuracy of the inventive geo ID as Open location Code (OLC Code) for different technical use and applications e.g., for smaller objects like equipment higher accuracy is needed compared to buildings. It is to be noted, that Open Location Codes typically define a geocode based in a system of regular grids for identifying an area anywhere on the Earth.

In addition, the inventive system allows to match geo IDs from different databases to each other, which is not possible by the prior art systems, the matching of records between datasets, can be one to one, one to many or many to many from one geo-database to another. The geo-data of the associated geo-database, e.g. can comprise, but does not necessarily comprise the original geospatial object, i.e. the geo database could comprise geospatial object, but it is technically not a necessary requirement for the matching. The matching can e.g., be based on at least two parameters i.e., IoU and IoA (cf. FIGS. 5 to 7). The first parameter (IoU) is generated based on intersection over union of two given geometries as measured area of overlap divided by the measured area of union (see FIG. 5). The second parameter (IoA) is generated based on the intersection over area of smaller areas as measured area of overlap divided by min (area1, area2), as illustrated by FIG. 6. The matching can e.g., be conducted using a binary classification algorithm with the parameters (variables) IoU and IoA, wherein a defined threshold is set between matched/unmatched pairs of geo IDs (cf. FIG. 7). The thresholds of matching can e.g., be fine-tuned and/or adaptively set based on technical requirements e.g., comprising precision or recall. As an embodiment variant, an additional machine learning structure is applied to improve matching performance. The additional machine learning structure can e.g. comprise additional feature parameter values at least comprising a parameter value representing a distance between centroid of two pair of geometries.

According to some embodiments, the geospatial data processing unit obtains the geospatial data from a geospatial data storage, and wherein the geospatial data processing unit obtains the geospatial data based on a user request. In an implementation, the geospatial data processing unit may monitor the data stored in the geospatial data storage in response to receiving a request from an operator of a server. In an example, the operator may be an individual or a team that oversees and manage the server to ensure that each geospatial object whose data is available in the geospatial data storage is associated with an optimized unique geo ID code. There may be a scenario where a geological object may be recently added to the geospatial data storage and hence a geo ID code may not have been generated for the geological object. In such scenario, the geospatial data processing unit obtains the geospatial data associated with the geospatial data from the geospatial data storage and processes the geospatial data to generate the geo ID code for the geospatial object.

According to some embodiments, the geo ID code generation unit calculates the directional extents with respect to sides of the boundary and based on the centroid of the footprint of the geospatial object. The directional extents can e.g. include north, south, east, and west extents. However, any other orders and structure of geographical directions can be used.

According to some embodiments, the geo ID code comprises a sequence of symbols. The geo ID code may distinctively identify the geospatial object. In an example, the sequence of symbols may include at least one of alphabets, numbers (digits), and a combination of alphabets and numbers. In an example, the geo ID code may be made up of the open location code (OLC) code of the centroid, the computed, and the angle at which the boundary for the footprint is oriented along the longest side of the boundary with reference to the reference plane. It is to be noted again that it can also be realized by doing it e.g. along the shortest boundary or any other definable direction of the footprint.

According to some embodiments, the system comprises a geo ID code processing unit for processing a geo ID code to identify a location of a geospatial object. According to some embodiments, the display provides the location of the geospatial object in response to receiving the geo ID code.

In another example embodiment, a method is provided for generating a unique geo ID code for a geospatial object to distinctively identify the geospatial object is disclosed. The generated geo ID code can e.g. be inputted or otherwise captured by a user device to retrieve details of the geospatial object. The method includes processing steps of obtaining, by means of a geospatial data processing unit, the geospatial data associated with the geospatial object; extracting, by means of the geospatial data processing unit, a footprint of the geospatial object based on the geospatial data; identifying, by means of a boundary determination unit, a centroid of the footprint of the geospatial object with respect to a reference plane, the centroid identifying a geo location of the geospatial object; determining, by means of the boundary determination unit, relevant boundary for the footprint of the geospatial object based on the centroid of the footprint such that the boundary captures the footprint of the geospatial object; determining, by means of a geo ID code generation unit, boundary determination unit, an orientation of the boundary with respect to a longest side of the boundary; rotating, by means of the geo ID code generation unit, the boundary around the centroid of the footprint of the geospatial object along the longest side of the boundary; computing, by means of the geo ID code generation unit, directional extents of the boundary based on the centroid of the footprint of the geospatial object; generating, by means of the geo ID code generation unit, the geo ID code for the geospatial object based on the computed directional extents, the centroid of the footprint of the geospatial object, and the orientation of the boundary; and displaying, by means of a display, the geo ID code for the geospatial object to a user.

According to some embodiments, the method further includes obtaining, by means of the geospatial data processing unit, the geospatial data from a geospatial data storage.

According to some embodiments, the method further includes processing, by means of the geospatial data processing unit, the footprint of the geospatial object to eliminate undesired data. In some cases, the footprint of the geospatial object may include irrelevant or undesired data or artifacts such as intersections, irregular shapes, etc. In such cases, the geospatial data processing unit may process the footprint of the geospatial object to eliminate irrelevant or undesired data. As a result, the footprint of the geospatial object gets cleansed and refined, and geometry of the footprint is validated.

According to some embodiments, the method further includes storing, by means of the geo ID code generation unit, the generated geo ID code for the geospatial object in a geo ID code storage.

Other embodiment variants and advantages of the inventive system and/or method will become apparent from the following detailed description, taken in conjunction with the accompanying drawings, which illustrate by way of example the teachings of the disclosure, and are not restrictive.

BRIEF DESCRIPTION OF THE DRAWINGS

The present invention will be explained in more detail below relying on examples and with reference to these drawings in which:

FIG. 2 exemplarily shows a diagram illustrating a process for generating a geo ID code for a geospatial object based on processing a footprint of the geospatial object, according to some embodiments.

FIG. 3 exemplarily shows a diagram illustrating a process for reconstructing a geospatial object in form of a rotated rectangle that represent the original geospatial object by processing a geo ID, thus, for identifying a geospatial object based on processing a geo ID code for the geospatial object, according to some embodiments.

FIG. 4 exemplarily shows a flow diagram, schematically illustrating a method for generating a geo ID code for a geospatial object based on processing geospatial data associated with the geospatial object, according to some embodiments.

DETAILED DESCRIPTION OF THE PREFERRED EMBODIMENTS

Figure 1:
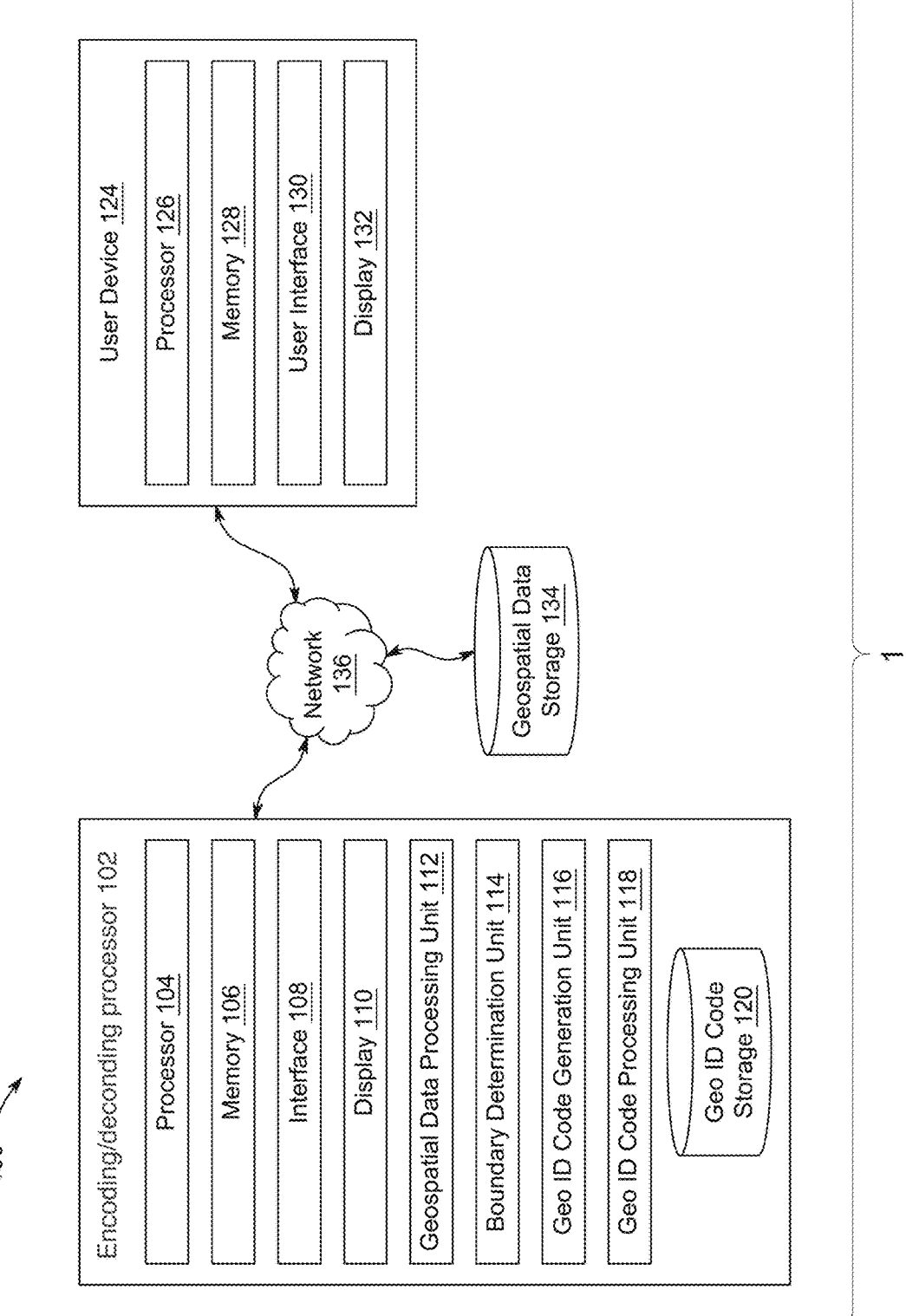
FIG. 1 exemplarily shows a block diagram, schematically illustrating an exemplary architecture of a system for generating a geo Identification (ID) code for a geospatial object based on processing geospatial data associated with the geospatial object, according to some embodiments.

FIG. 1 to FIG. 7 schematically illustrate an architecture for a geospatial digital encoding, decoding and mapping system 100 and a method for processing and geospatial data to generate an unique geo identification (ID) code 212 for a geospatial object distinctively identifying the geospatial object and for decoding and mapping an unique geo identification (ID) code 212 to a digital representation, wherein the system 100 comprises a geospatial data processing unit 112 for capturing geospatial data associated with a geospatial object, and extracting a footprint 202 of the geospatial object based on the geospatial data. The geo-spatial encoding and decoding system 100 comprises a boundary determination unit 114 for identifying a boundary 206 of the footprint 202 of the geospatial object with respect to a reference plane 210. The centroid 204 identifies a geo location of the geospatial object, and determining relevant boundary 206 for the footprint 202 of the geospatial object based on the centroid 204 of the footprint 202 such that the boundary (206) captures the footprint (202) of the geospatial object. The digital system 100 comprises a geo ID code generation unit 116 for determining an orientation of the boundary 206 with respect to a longest side 208 of the boundary 206, rotating the boundary 206 around the centroid 204 of the footprint 202 of the geospatial object along the longest side 208 of the boundary 206, computing directional extents 216 of the boundary 206) based on the centroid 204 of the footprint 202 of the geospatial object, and generating a geo ID code 212 for the geospatial object based on the computed directional extents 216, the centroid 204 of the footprint 202 of the geospatial object, and the orientation of the boundary 206.

The system 100 further comprises a digital geo ID decoder for decoding a received geo ID, wherein a geo ID is received as an input, for example from a user device over a data transmission network. The geo ID is validated and a digital representation is generated digitally representing the originally encoded geospatial object. The digital representation can e.g. be realized as a rotated two or three dimensional polygon. The rotated polygon can e.g. be realized as a rotated digital rectangle.

Figure 5:
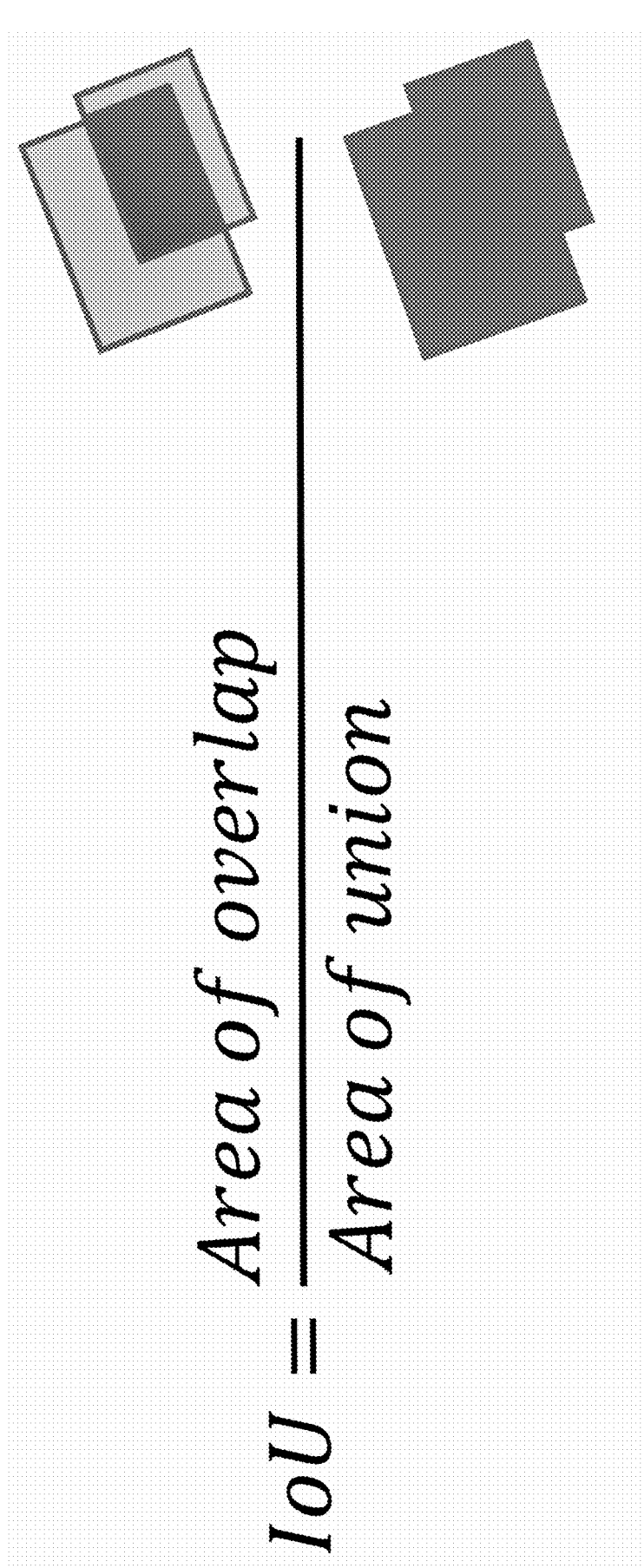
FIG. 5 schematically illustrates the generation of the parameter IoU given by the measured or captured intersection over union of two given geometries of two datasets, generated by dividing the measured area of overlap by the measured area of union.
Figure 6:
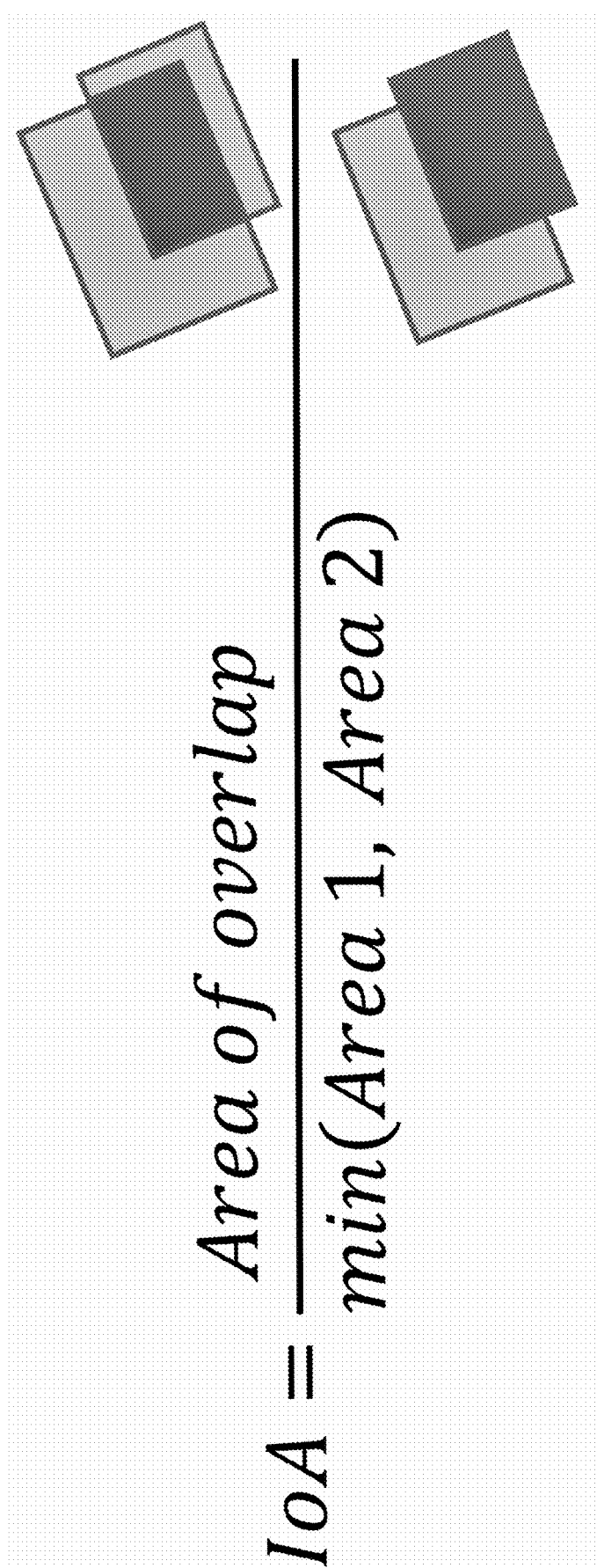
FIG. 6 schematically illustrates the generation of the parameter IoA given by the measured or captured intersection over area of two smaller geometries of two datasets, generated by dividing the measured area of overlap by the measured min (area1,area2), i.e. the smaller area of two datasets. Therefore for a pair of datasets, the FIG. 5 showing the IoU and FIG. 6 showing the IoA of each pair of geometries that could be potentially matched.
Figure 7:
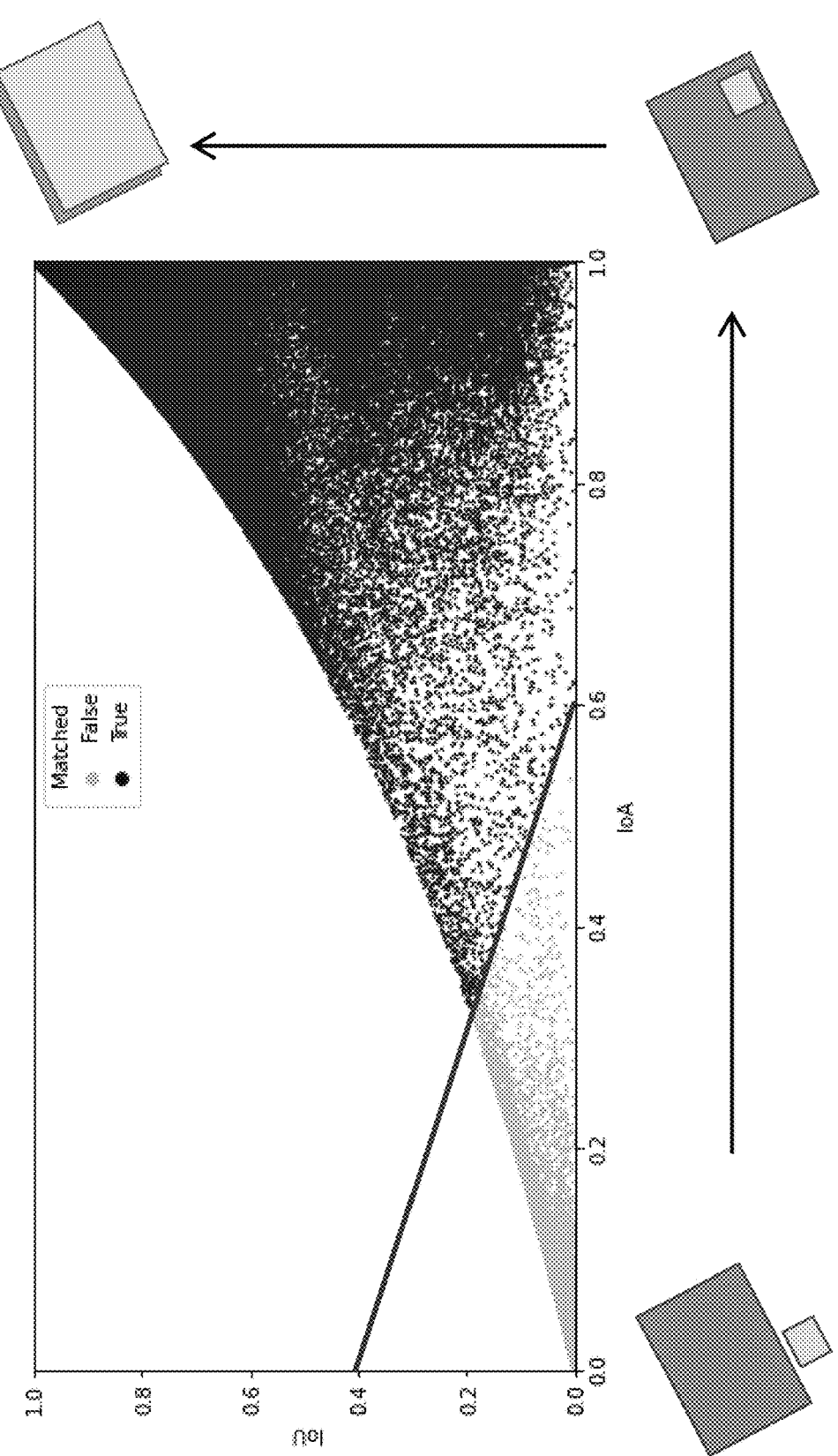
FIG. 7 schematically illustrates matching e.g., realized as a linear binary classification function with two parameters IoU and IoA, defines a threshold between matched/unmatched pairs. The thresholds of matching rule can e.g. be finetuned based on the technical or other requirement (e.g., better precision or recall). Other machine learning algorithm (e.g., non-linear functions, tree-based algorithms) with or without additional features (e.g., distance between centroid of two pair of geometries) can also be used to achieve better matching performance.

As illustrated by FIGS. 5 to 7, the matching is based at least on two parameters. A first parameter (IoU) is generated based on intersection over union of two given geometries as measured area of overlap divided by the measured area of union (see FIG. 5). A second parameter (IoA) is generated based on the intersection over area of smaller areas as measured area of overlap divided by min (area1,area2), as illustrated by FIG. 6. The matching can e.g. be conducted using a binary classification function with two parameters IoU and IoA, wherein a defined threshold is set between matched/unmatched pairs of datasets (cf. FIG. 7). The thresholds of matching can e.g. be fine-tuned and/or adaptively set based on technical requirements at least comprising precision or recall. As an embodiment variant, an additional machine learning structure is applied to improve matching performance. The additional machine learning structure can e.g. comprise additional feature parameter values at least comprising a parameter value representing a distance between centroid of two pair of geometries. For the matching algorithm can generate one to one, one to many or many to many pairs of geo IDs from geo-database of the system 100. The geo-data of the associated geo-database does e.g. not necessarily comprise the original geospatial object.

Thus, the system 100 provides the technical means for automatedly generating a geo ID code for a geospatial object based on processing geospatial data associated with the geospatial object, according to the invention. The system obtains geospatial data associated with a geospatial object and extracts a footprint of the geospatial object based on the geospatial data. This is, from the geospatial data (vector data, i.e. polygons), the system 100 obtains the geospatial objects e.g., building footprints, then the system 100 generate geo ID for each object after some data cleaning. Further, the system identifies a centroid of the footprint of the geospatial object with respect to a reference plane, the centroid identifying a geo location of the geospatial object. The system then determines relevant boundary for the footprint of the geospatial object based on the centroid of the footprint such that the boundary captures the footprint of the geospatial object. The system further determines an orientation of the boundary with respect to a longest side of the boundary, and rotates the boundary around the centroid of the footprint of the geospatial object along the longest side of the boundary. The system also computes directional extents of the boundary based on the centroid of the footprint of the geospatial object, and generates the geo ID code for the geospatial object based on the computed directional extents, the centroid of the footprint of the geospatial object, and the orientation of the boundary.

In particular, FIG. 1 shows a block diagram, schematically illustrating an exemplary architecture of the system 100 for generating a geo ID code for a geospatial object based on processing geospatial data associated with the geospatial object, according to some embodiment variants. In one implementation, the system 100 may include an encoding/decoding processor 102, a user device 124, a geospatial data storage 134, and a network 136 enabling communication between the system components for information exchange. According to some aspects, the system 100 may be used for urban planning, risk assessment, network planning, in web-based navigation applications, and in various other applications.

In one implementation, the encoding/decoding processor 102 may be implemented as a device having a processor and a memory. As used herein, the term "processor" refers to a computational element that is operable to respond to and processes instructions that drive the system. Optionally, the processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processor" may refer to one or more individual processors, processing devices and various elements associated with a processing device that may be shared by other processing devices. Additionally, the one or more individual processors, processing devices and elements are arranged in various architectures for responding to and processing the instructions that drive the system.

The processor and accompanying components have connectivity to the memory via the bus. The memory includes both dynamic memory (e.g., RAM, magnetic disk, writable optical disk, etc.) and static memory (e.g., ROM, CD-ROM, etc.) for storing executable instructions that when executed perform the method steps described herein for decentralized auditing of the blockchain network. In particular, the memory includes a module arrangement (or a module) to perform steps for decentralized auditing of the blockchain network. The memory also stores the data associated with or generated by the execution of the inventive steps.

Herein, the memory may be volatile memory and/or non-volatile memory. The memory may be coupled for communication with the processor. The processor may execute instructions and/or code stored in the memory. A variety of computer-readable storage media may be stored in and accessed from the memory. The memory may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like.

In another implementation, the encoding/decoding processor 102 may be implemented as a circuit or a specialized processing chip. In one or more implementations, the encoding/decoding processor 102 may be implemented or executed by one or multiple computing devices, which may be connected to a network (e.g., the internet or a local area network), such as the network 136. Examples of computing devices may include, but are not limited to, a personal computer(s), a laptop computer(s), mobile computing device (s), a server computer, a series of server computers, a mainframe computer(s), or a computing cloud(s).

In certain implementations, the computing device may be a physical or virtual device. In many implementations, the computing device may be any device capable of performing operations, such as a dedicated processor, a portion of a processor, a virtual processor, a portion of a virtual processor, a portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic.

In an example, the computing device may be a computer-program product programmed for generating geo ID codes for geospatial objects and/or for processing geo ID codes to identify corresponding geospatial objects. In another example, the computing device may be a computer readable medium on which program code sections of a computer program are saved, the program code sections being loadable into and/or executable in a system to make the system execute the steps for performing the said purpose. The computing device may be incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments, the computing device can be implemented in a single chip.

In one embodiment, the computing device includes a communication mechanism such as a bus for passing information among the components of the computing device. The computing device includes one or more processing units and a memory unit. Generally, the memory unit is communicatively coupled to the one or more processing units. Hereinafter, the one or more processing units are simply referred to as processor, and the memory unit is simply referred to as memory. Herein, in particular, the processor has connectivity to the bus to execute instructions and process information stored in the memory. The processor may include one or more processing cores with each core configured to perform independently. A multi-core processor enables multiprocessing within a single physical package. Examples of a multi-core processor include two, four, eight, or greater numbers of processing cores. Alternatively, or in addition, the processor may include one or more microprocessors configured in tandem via the bus to enable independent execution of instructions, pipelining, and multithreading. The processor may also be accompanied by one or more specialized components to perform certain processing functions and tasks such as one or more digital signal processors (DSP), or one or more application-specific integrated circuits (ASIC). A DSP typically is configured to process real-world signals (e.g., sound) in real time independently of the processor. Similarly, an ASIC can be configured to perform specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

In one implementation, the encoding/decoding processor 102 may include a processor 104 and a memory 106. In an implementation, the processor 104 may be any logic circuitry that responds to and processes instructions fetched from the memory 106. In many embodiments, the processor 104 may be provided by a microprocessor unit, e.g., those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The processor 104 may utilize instruction-level parallelism, thread-level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

The memory 106 may include one or more memory chips capable of storing data and allowing any storage location to be directly accessed by the processor 104. The memory 106 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the memory 106 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The memory 106 may be based on any of the above described memory chips, or any other available memory chips capable of operating as described herein.

Referring to FIG. 1, the encoding/decoding processor 102 may further include an interface 108. The interface 108 may include a variety of software and hardware interfaces, such as a product board, a mouse, a keyboard, a touch screen, a haptic sensor, a voice-based input unit, or any other appropriate interface. Additionally, the interface 108 may enable the encoding/decoding processor 102 to communicate with other devices, such as the user device 124 and the geospatial data storage 134. The interface 108 may also facilitate multiple communications within a wide variety of networks and protocol types, including wired networks, for example, LAN, cable, etc., and wireless networks, such as WLAN, cellular, or satellite. For the purpose, the interface 108 may include one or more ports.

The encoding/decoding processor 102 may also include display 110, such as a screen, a monitor connected to the device in any manner, or any other appropriate display. In an implementation, the encoding/decoding processor 102 may display content for an end user using display 110 and is able to accept a user interaction (such as a user request, a user query, etc.) via interface 108 responsive to the displayed content. In an example, the content may include visual representations of geospatial objects, geo ID codes associated with the geospatial objects, information corresponding to the geospatial objects, etc.

Referring again to FIG. 1, the encoding/decoding processor 102 may further include a geospatial data processing unit 112, a boundary determination unit 114, a geo ID code generation unit 116, and a geo ID code processing unit 118. In some implementations, the geospatial data processing unit 112, the boundary determination unit 114, the geo ID code generation unit 116, and the geo ID code processing unit 118 may be accessed via one or more client applications. In some implementations, each of the geospatial data processing unit 112, the boundary determination unit 114, the geo ID code generation unit 116, and the geo ID code processing unit 118 may be a standalone application, or an applet/application/script/extension that may interact with and/or be executed within application a component of application and/or one or more of client applications. In some implementations, one or more of client applications may be a standalone application, or may be an applet/application/script/extension that may interact with and/or be executed within and/or be a component of the geospatial data processing unit 112, the boundary determination unit 114, the geo ID code generation unit 116, and the geo ID code processing unit 118, and/or application. Examples of client applications may include, but are not limited to, a standard and/or mobile web browser, an email application (e.g., an email client application), a textual and/or a graphical user interface, a customized web browser, a plugin, an Application Programming Interface (API), or a custom application. The instruction sets and subroutines of client applications which may be stored on storage devices coupled to user devices may be executed by one or more processors and one or more memory architectures incorporated into user devices.

In some implementations, one or more client applications may effectuate some or all of the functionality of the geospatial data processing unit 112, the boundary determination unit 114, the geo ID code generation unit 116, and the geo ID code processing unit 118 (and vice versa). Accordingly, in some implementations, each of the geospatial data processing unit 112, the boundary determination unit 114, the geo ID code generation unit 116, and the geo ID code processing unit 118 may be a purely server-side application, a purely client-side application, or a hybrid server-side/client-side application that is cooperatively executed by one or more of client applications and/or each of the geospatial data processing unit 112, the boundary determination unit 114, the geo ID code generation unit 116, and the geo ID code processing unit 118.

In some implementations, one or more client applications may effectuate some or all of the functionality of application (and vice versa). Accordingly, in some implementations, application may be a purely server-side application, a purely client-side application, or a hybrid server-side/client-side application that is cooperatively executed by one or more of client applications and/or application. As one or more of client applications, each of the geospatial data processing unit 112, the boundary determination unit 114, the geo ID code generation unit 116, and the geo ID code processing unit 118, and application taken singly or in any combination, may effectuate some or all of the same functionality, any description of effectuating such functionality via one or more of client applications, each of the geospatial data processing unit 112, the boundary determination unit 114, the geo ID code generation unit 116, and the geo ID code processing unit 118, application or combination thereof, and any described interaction(s) between one or more of client applications, each of the geospatial data processing unit 112, the boundary determination unit 114, the geo ID code generation unit 116, and the geo ID code processing unit 118, application or combination thereof to effectuate such functionality, should be taken as an example only and not to limit the scope of the disclosure.

According to an implementation, the encoding/decoding processor 102 may include a geo ID code storage 120. In an implementation, the geo ID code storage 120 may include geo ID codes generated for geospatial objects. In an example, a geo ID code may include a sequence of symbols. In an example, the geo ID codes generated for the geospatial objects stored in the geo ID code storage 120 may be periodically or dynamically updated as required. In an implementation, the geo ID code storage 120 may include any type or form of storage, such as a database or a file system or coupled to memory 106.

Referring to FIG. 1, in some embodiments, the user device 124 may be any device used by a user. In an example, the user may be an end user. In an implementation, the user device 124 may be any computing device, such as a desktop computer, a laptop, a tablet computer, a mobile device, a Personal Digital Assistant (PDA), or any other computing device. According to some embodiments, the user device 124 may include a processor 126 and a memory 128. In an implementation, the processor 126 may be any logic circuitry that responds to and processes instructions fetched from the memory 128. In many embodiments, the processor 126 may be provided by a microprocessor unit, e.g., those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The processor 126 may utilize instruction-level parallelism, thread-level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

The memory 128 may include one or more memory chips capable of storing data and allowing any storage location to be directly accessed by the processor 126. The memory 128 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the memory 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The memory 128 may be based on any of the above described memory chips, or any other available memory chips capable of operating as described herein.

According to one implementation, the user device 124 may further include a user interface 130. The user interface 130 may include a variety of software and hardware interfaces, such as a product board, a mouse, a keyboard, a touch screen, a haptic sensor, a voice-based input unit, or any other appropriate interface. Additionally, the user interface 130 may enable the user device 124 to communicate with other devices, such as encoding/decoding processor 102 and geospatial data storage 134. The user interface 130 may also facilitate multiple communications within a wide variety of networks and protocol types, including wired networks, for example, LAN, cable, etc., and wireless networks, such as WLAN, cellular, or satellite. For the purpose, the user interface 130 may include one or more ports.

The user device 124 may also include display 132, such as a screen, a monitor connected to the device in any manner, or any other appropriate display. In an implementation, the user device 124 may display content for an end user using display 132 and is able to accept a user interaction (such as a user request, a user query, etc.) via the user interface 130 responsive to the displayed content.

According to an implementation, the geospatial data storage 134 may be a dynamic database that includes a public database and/or a private database. In an implementation, the geospatial data storage 134 may be a third-party database. The geospatial data storage 134 may store geospatial data associated with geospatial objects. In an example, the geospatial data may be positional data with or without attribute data tagged, in the form of images, videos, vector, voxel and/or raster datasets or any other type of geospatial dataset in digitized or non-digitized form or web-services. In an example, geospatial data associated with a geospatial object may include information related to geographical location of the geospatial object and other features related to the geospatial object, such as shape, dimensions, and area of the geospatial object. In some examples, the geospatial data associated with the geospatial object may also include a footprint of the geospatial object. Other examples of geospatial data that are not discussed here are contemplated herein.

In an implementation, the geospatial data storage 134 may be accessed whenever a geo ID code is to be generated for a geospatial object by the encoding/decoding processor 102. Further, the geospatial data stored in the geospatial data storage 134 may be periodically or dynamically updated as required. For example, new data may be added into the geospatial data storage 134, existing data in the geospatial data storage 134 may be modified, or non-useful data may be deleted from the geospatial data storage 134. Although the geospatial data storage 134 is shown external to the encoding/decoding processor 102, in some embodiments, the geospatial data storage 134 can also be implemented within the encoding/decoding processor 102.

According to an implementation, the network 136 may be a private network or a public network. Further, the network 136 may be connected via wired and/or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel, or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g., FDMA, TDMA, CDMA, or SDMA. In some embodiments, different types of data may be transmitted via different links and standards. In other embodiments, the same types of data may be transmitted via different links and standards.

Further, the network 136 may be any type and/or form of network. The geographical scope of the network may vary widely and the network 136 can be a body area network (BAN), a personal area network (PAN), a local-area network (LAN), e.g., Intranet, a metropolitan area network (MAN), a wide area network (WAN), or the Internet. The topology of the network 136 may be of any form and may include, e.g., any of the following: point-to-point, bus, star, ring, mesh, or tree. The network 136 may be an overlay network which is virtual and sits on top of one or more layers of other networks. Also, the network 136 may be of any such network topology as known to those ordinarily skilled in the art capable of supporting the operations described herein. The network 136 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPV4 and IPV6), or the link layer. The network 136 may be a type of broadcast network, a telecommunications network, a data communication network, or a computer network.

In an embodiment, referring to FIG. 1, the geospatial data processing unit 112 may repeatedly (e.g., periodically, intermittently, at scheduled, unscheduled, or random intervals, etc.) monitor data stored in the geospatial data storage 134 to identify if there is any geospatial object whose geo ID code is not generated. A geo ID code associated with a geospatial object may distinctively identify the geospatial object. Examples of the geospatial object include, but are not limited to, a building, a land, and an equipment. In an implementation, the geospatial data processing unit 112 may monitor the data stored in the geospatial data storage 134 in response to receiving a request from an operator of the encoding/decoding processor 102. In an example, the operator may be an individual or a team that oversees and manage encoding/decoding processor 102 to ensure that each geospatial object whose data is available in the geospatial data storage 134 is associated with an optimized unique geo ID code.

As described earlier, the geospatial data storage 134 may be periodically or dynamically updated. For example, new data may be added to the geospatial data storage 134, existing data in the geospatial data storage 134 may be modified, and/or non-useful data may be deleted from the geospatial data storage 134. Accordingly, there may be a scenario where a geological object may be recently added to the geospatial data storage 134 and hence a geo ID code may not have been generated for the geological object. In such scenario, a geo ID code generation process may be initiated for the geospatial object.

In an implementation, the geospatial data processing unit 112 may obtain the geospatial data associated with the geospatial object from the geospatial data storage 134. In an example, the geospatial data associated with the geospatial object may include information related to geographical location of the geospatial object and other features related to the geospatial object, such as shape, dimensions, and area of the geospatial object.

Upon obtaining the geospatial data associated with the geospatial object from the geospatial data storage 134, the geospatial data processing unit 112 may extract a footprint of the geospatial object based on the geospatial data. The geospatial data processing unit 112 may process the geospatial data associated with the geospatial object to extract the footprint of the geospatial object. In an example, the footprint of the geospatial object may provide a ground-centered visual representation of location, shape, dimensions, and area of the geospatial object. For example, the footprint of the geospatial object may provide information related to geographic coordinates of the geospatial object. In an example, the footprint may be a two-dimensional visual representation of the geospatial object. In an implementation, the geospatial data processing unit 112 may calculate the latitude and longitude of corners of the footprint.

In an embodiment variant, the geospatial data processing unit 112 may receive a request from a user (for example, a user of the user device 124) to generate a geo ID code for a geospatial object. In an example, the geospatial object may be a newly constructed building that has not been captured in the geospatial data storage 134 or whose information is not available in the geospatial data storage 134. In an implementation, the user may provide information (such as geographical coordinates) associated with the geospatial object. Upon receiving the information associated with the geospatial object, the geospatial data processing unit 112 may process the information to extract the footprint of the geospatial object. In some implementations, the footprint of the geospatial object may already be available in the geospatial data storage 134, and the geospatial data processing unit 112 may retrieve the footprint of the geospatial object from the geospatial data storage 134.

In some cases, the footprint of the geospatial object may include irrelevant or undesired data or artifacts such as intersections, irregular shapes, etc. In such cases, the geospatial data processing unit 112 may process the footprint of the geospatial object to eliminate irrelevant or undesired data. As a result, the footprint of the geospatial object gets cleansed and refined, and geometry of the footprint is validated.

According to an implementation, the boundary determination unit 114 may identify a centroid of the footprint of the geospatial object with respect to a reference plane, where the centroid identifies a geo location of the geospatial object. In an example, the centroid may be a two-dimensional center of mass. In an implementation, the boundary determination unit 114 may identify the centroid of the footprint of the geospatial object based on the geometry of the footprint. According to an implementation, the boundary determination unit 114 may calculate latitude and longitude of the centroid of the footprint.

In an implementation, the boundary determination unit 114 may further determine relevant boundary for the footprint of the geospatial object based on the centroid of the footprint such that the boundary captures the footprint of the geospatial object. According to an implementation, the boundary determination unit 114 may determine the relevant boundary for the footprint of the geospatial object based on the latitude and the longitude of the centroid. In example, the boundary determination unit 114 may determine relevant boundary for the footprint of the geospatial object such that the boundary captures the footprint of the geospatial object. In an example, the boundary may be a two-dimensional bounding box that captures the footprint.

In an implementation, the boundary determination unit 114 may determine the boundary for the footprint of the geospatial object based on a rectangular grid reference system. The rectangular grid reference system defines unique rectangle regions to establish the position of the geographic location of the geospatial object. In an example, the boundary determination unit 114 may use an open location code (OLC) application. Although other known examples and implementations of identifying the centroid of the footprint and determining the boundary of the footprint are contemplated herein, these need not be described in full within this disclosure.

In an implementation, the boundary determination unit 114 may create an OLC code for the centroid. In an example, the boundary determination unit 114 may create the OLC code for the centroid using the OLC application. According to an implementation, the boundary determination unit 114 may convert the centroid into OLC reference cell. In an example, the boundary determination unit 114 may convert the latitude and the longitude of the centroid into the OLC reference cell.

According to an implementation, the geo ID code generation unit 116 may determine an orientation of the boundary with respect to a longest side of the boundary. According to an implementation, the geo ID code generation unit 116 may determine the orientation of the boundary with reference to a reference plane. The orientation of the boundary may define an angle through which the boundary has rotated with reference to a reference plane. In an example, the boundary may be oriented at an angle between 0 degrees to 180 degrees relative to the longest side of the boundary, and with reference to the reference plane. In an implementation, the geo ID code generation unit 116 may calculate at angle at which the boundary for the footprint is rotated along the longest side of the boundary. Further, the geo ID code generation unit 116 may rotate the boundary around the centroid of the footprint of the geospatial object along the longest side of the boundary such that the boundary is aligned with the reference plane. In an example, if the boundary is oriented 30 degrees with reference to the reference plane, then the geo ID code generation unit 116 may rotate the boundary by 30 degrees such that the boundary is aligned with the reference plane. In an example, the rotated boundary may interchangeably be referred to as transformed boundary.

In an implementation, the geo ID code generation unit 116 may compute directional extents of the transformed boundary based on the centroid of the footprint of the geospatial object. The geo ID code generation unit 116 may calculate the directional extents with respect to sides of the transformed boundary and based on the centroid of the footprint of the geospatial object. In an example, the directional extents may include north, south, east, and west extents. According to an implementation, the geo ID code generation unit 116 may calculate the number of OLC cells or units from the OLC reference cell to the sides of the boundary in the north, east, south, and west directions.

According to an implementation, the geo ID code generation unit 116 may generate the geo ID code for the geospatial object based on the computed directional extents, the centroid of the footprint, and the orientation of the boundary (i.e., at angle at which the boundary for the footprint is oriented along the longest side of the boundary with reference to the reference plane, also called rotation angle). In an example, the geo ID code may include a sequence of symbols. The geo ID code may distinctively identify the geospatial object. In an example, the sequence of symbols may include at least one of alphabets, numbers (digits), and a combination of alphabets and numbers. In an example, the geo ID code may be made up of the OLC code of the centroid, the computed, and the angle at which the boundary for the footprint is oriented along the longest side of the boundary with reference to the reference plane. In an example, the geo ID code may be human writable and readable, and machine readable and executable. According to an implementation, the geo ID code generation unit 116 may store the geo ID code for the geospatial object in the geo ID code storage 120. According to some embodiments, the geo ID code generation unit 116 may also store the geo ID code for the geospatial object in the geospatial data storage 134, such that the geospatial object is associated with the geo ID code.

For ease of explanation and understanding, descriptions provided above is with reference to generation of a geo ID code for a single geospatial object, however, the description is equally applicable to generation of geo ID codes for a plurality of geospatial objects. Accordingly, the geo ID code storage 120 may include a plurality of generated geo ID codes.

According to an implementation, the geo ID code processing unit 118 may receive a request from a user (for example, the operator of encoding/decoding processor 102 or the user of user device 124) to process a geo ID code to identify a geospatial object corresponding to the geo ID code. In an example, the user may provide the geo ID code to the geo ID code processing unit 118 via the interface 108. In an example, the geo ID code may include OLC code of centroid, extents, and an angle at which boundary of footprint of the geospatial object is oriented. In an implementation, upon receiving the geo ID code, the geo ID code processing unit 118 may process the geo ID code to decode it. According to an implementation, the geo ID code processing unit 118 may process the geo ID code to determine the OLC code of the centroid, extents, and the angle at which the boundary of the footprint of the geospatial object is oriented. In an implementation, based on the decoded data (i.e., the OLC code of the centroid and the extents, and the rotation angle), the geo ID code processing unit 118 may create the boundary and subsequently identify the geospatial object associated with the geo ID code. In an implementation, the geo ID code processing unit 118 may provide the geospatial object to the user via the display 110. In an implementation, the geo ID code processing unit 118 may process the geo ID code to identify a location of the geospatial object. In an example, the geo ID code processing unit 118 may display the location of the geospatial object via the display 110.

Examples by which the geo ID code is generated for the geospatial object are explained in detail with reference to FIG. 2, and examples by which a geospatial object is identified based on processing of a geo ID code for the geospatial object are explained in detail with reference to FIG. 3.

FIG. 2 shows a diagram illustrating a process 200 for generating a geo ID code 212 for a geospatial object based on processing a footprint 202 of the geospatial object, according to some embodiments.

In an implementation, the geospatial data processing unit 112 may receive a request for generating a geo ID code 212 for a geospatial object. In an example, the geospatial object may be a building. In response to receiving the request for generating the geo ID code 212 for the geospatial object, the geospatial data processing unit 112 may extract a footprint 202 of the geospatial object. In an implementation, the geospatial data processing unit 112 may retrieve the footprint 202 of the geospatial object from the geospatial data storage 134. In some implementations, the geospatial data processing unit 112 may retrieve geospatial data associated with the geospatial object from the geospatial data storage 134. The geospatial data processing unit 112 may then process the geospatial data to extract the footprint 202 of the geospatial object. (Step 1 of process 200)

According to an implementation, once the footprint 202 of the geospatial object is obtained, the boundary determination unit 114 may identify a centroid 204 of the footprint 202 of the geospatial object with respect to a reference plane 210. In an example, the centroid 204 may identify a geo location of the geospatial object. In an implementation, the boundary determination unit 114 may create an OLC code for the centroid 204. In an example, the boundary determination unit 114 may create the OLC code for the centroid 204 using an OLC application. According to an implementation, the boundary determination unit 114 may convert the centroid 204 into OLC reference cell. In an implementation, the boundary determination unit 114 may determine relevant boundary 206 for the footprint 202 of the geospatial object based on the centroid 204 of the footprint 202 such that the boundary 206 captures the footprint 202 of the geospatial object. In an implementation, the geo ID code generation unit 116 may determine an orientation of the boundary 206 with respect to a longest side 208 of the boundary 206. According to an implementation, the geo ID code generation unit 116 may determine the orientation of the boundary 206 with reference to a reference plane 210. The orientation of the boundary 206 may define an angle through which the boundary 206 has rotated with reference to the reference plane 210. As shown in FIG. 2, the boundary 206 is oriented at an angle of 30 degrees relative to the longest side 208 of the boundary 206, and with reference to the reference plane 210. (Step 2 of process 200)

In an implementation, the geo ID code generation unit 116 may rotate the boundary 206 around the centroid 204 of the footprint 202 of the geospatial object along the longest side 208 of the boundary 206 such that the boundary 206 is aligned with the reference plane 210. As shown in FIG. 2, the boundary 206 is rotated by 30 degrees such that the boundary 206 is aligned with the reference plane 210. (Step 3 of process 200)

According to an implementation, the geo ID code generation unit 116 may compute directional extents of the boundary 206 based on the centroid 204 of the footprint 202 of the geospatial object. The geo ID code generation unit 116 may calculate the directional extents with respect to sides of the boundary 206 and based on the centroid 204 of the footprint 202 of the geospatial object. In an example, the directional extents may include north, south, east, and west extents. According to an implementation, the geo ID code generation unit 116 may calculate the number of OLC cells or units from the OLC reference cell to the sides of the boundary 206 in the north, east, south, and west directions. As shown in FIG. 2, the geo ID code generation unit 116 calculates the extents as 2, 7, 3, and 6. According to an implementation, the geo ID code generation unit 116 may generate a geo ID code 212 for the geospatial object based on the computed directional extents, the centroid 204 of the footprint 202, and the orientation of the boundary 206. The geo ID code 212 may distinctively identify the geospatial object. As shown in FIG. 2, the geo ID code 212 is a sequence of symbols. In an example, the geo ID code 212 is made up of OLC code of centroid 204 (represented by reference number "214"), the directional extents (represented by reference number "216"), and the angle at which the boundary 206 for the footprint 202 is oriented along the longest side 208 of the boundary 206 with reference to the reference plane 210 (represented by reference number "218"). Accordingly, the geospatial object is encoded into the geo ID code 212. (Step 4 of process 200)

FIG. 3 shows a diagram illustrating a process 300 for identifying a geospatial object based on processing a geo ID code 302 for the geospatial object, according to some embodiments.

According to an implementation, the geo ID code processing unit 118 may receive a request from a user (for example, the operator of encoding/decoding processor 102 or the user of user device 120) to process a geo ID code 302 to identify a geospatial object corresponding to the geo ID code 302. In an example, the user may provide the geo ID code 302 to the geo ID code processing unit 118. The geo ID code 302 is shown in FIG. 3. The geo ID code 302 is made up of known codes such as OLC code or proprietary codes of the centroid 310 (represented by reference number "304"), directional extents (represented by reference number "306"), and the angle at which the boundary 312 of the footprint of the geospatial object is oriented (represented by reference number "308"). As shown in FIG. 3, "8FVC9FJM+97 W" is the OLC code of the centroid 310, "2-7-3-6" are the extents, and "30" represents the angle at which the boundary 312 of the footprint of the geospatial object is oriented (i.e., the rotation angle). (Step 1 of process 300)

In an implementation, upon receiving the geo ID code 302, the geo ID code processing unit 118 may process the geo ID code 302 to decode the geo ID code 302. According to an implementation, the geo ID code processing unit 118 may process the geo ID code 302 to determine the OLC code of the centroid 310, extents, and the angle at which the boundary 312 of the footprint of the geospatial object is oriented. In an implementation, based on the decoded data (i.e., the OLC code of the centroid and the extents), the geo ID code processing unit 118 may create the boundary 312. (Step 2 of process 300).

According to an implementation, the geo ID code processing unit 118 may rotate the boundary 312 around the centroid 204 based on the rotation angle included in the geo ID code 302. Based on the boundary 312, the geospatial object can be identified. (Step 3 of process 300)

Accordingly, the present disclosure addresses the problems of object underwriting identification, of object pricing and risk-assessment optimizing risk-cover for non-life risks on geospatial (or geographical) objects and the related difficulties to control/monitor/predict appropriate risk covers and risk-transfer pricing. Further, the present disclosure has the advantage of allowing for making an important shift from address-level to building-level underwriting, which leads to more accurate property costing, better risk selection, and accumulation management. In an aspect, a one-to-one and many to many relationship between the datasets can be created with tunable parameter (geo-fuzzy matching). Further, the present disclosure allows fast lookup of data records using generated geo ID codes with geo-fuzzy matching and geocode. The present disclosure also enables creation of relationship between diverse internal and external datasets where no common identifier is available.

FIG. 4 shows a flow diagram, schematically illustrating a method 400 for generating a geo ID code for a geospatial object based on processing geospatial data associated with the geospatial object, according to some embodiments.

Step 402 includes obtaining geospatial data associated with a geospatial object. According to an implementation, the geospatial data processing unit 112 may obtain the geospatial data associated with the geospatial object. In an example, the geospatial object includes a building, a land, or an equipment. In an implementation, the geospatial data processing unit 112 may obtain the geospatial data from the geospatial data storage 134. According to an implementation, the geospatial data processing unit 112 may obtain the geospatial data based on a user request.

Step 404 includes extracting a footprint of the geospatial object based on the geospatial data. According to an implementation, the geospatial data processing unit 112 may extract the footprint of the geospatial object based on the geospatial data. In some implementations, the geospatial data processing unit 112 may process the footprint of the geospatial object to eliminate undesired data.

Step 406 includes identifying a centroid of the footprint of the geospatial object with respect to a reference plane, the centroid identifying a geo location of the geospatial object. According to an implementation, the boundary determination unit 114 may identify the centroid of the footprint of the geospatial object with respect to the reference plane. In an example, the centroid may identify the geo location of the geospatial object.

Step 408 includes determining relevant boundary for the footprint of the geospatial object based on the centroid of the footprint such that the boundary captures the footprint of the geospatial object. According to an implementation, the boundary determination unit 114 may determine the relevant boundary for the footprint of the geospatial object based on the centroid of the footprint such that the boundary captures the footprint of the geospatial object.

Step 410 includes determining an orientation of the boundary with respect to a longest side of the boundary. According to an implementation, the geo ID code generation unit 116 may determine the orientation of the boundary with respect to the longest side of the boundary. In an example, the boundary may be oriented at an angle between 0 degrees to 180 degrees relative to the longest side of the boundary, and with reference to a reference plane.

Step 412 includes rotating the boundary around the centroid of the footprint of the geospatial object along the longest side of the boundary. According to an implementation, the geo ID code generation unit 116 may rotate the boundary around the centroid of the footprint of the geospatial object along the longest side of the boundary.

Step 414 includes computing directional extents of the boundary based on the centroid of the footprint of the geospatial object. According to an implementation, the geo ID code generation unit 116 may compute the directional extents of the boundary based on the centroid of the footprint of the geospatial object. In an implementation, the geo ID code generation unit 116 may calculate the directional extents with respect to sides of the boundary and based on the centroid of the footprint of the geospatial object. In an example, the directional extents include north, south, east, and west extents.

Step 416 includes generating the geo ID code for the geospatial object based on the computed directional extents, the centroid of the footprint of the geospatial object, and the orientation of the boundary. According to an implementation, the geo ID code generation unit 116 may generate the geo ID code for the geospatial object based on the computed directional extents, the centroid of the footprint of the geospatial object, and the orientation of the boundary. The geo ID code may distinctly identify the geospatial object. In an example, the geo ID code includes a sequence of symbols. In an implementation, the geo ID code generation unit 116 may store the geo ID code for the geospatial object in the geo ID code storage 120.

Step 418 includes displaying the geo ID code for the geospatial object to a user. According to an implementation, the geo ID code generation unit 116 may display the geo ID code for the geospatial object to the user using the display 110.

The order in which the method 400 is described is not intended to be construed as a limitation, and any number of the described method blocks can be combined in any order to implement the method 400, or an alternative method.

While various embodiment variants of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

REFERENCE LIST

1 Geospatial encoding and decoding technical structure and system
100 Geospatial encoding, decoding, and mapping system
102 Encoding/decoding processor
104 Processor
106 Memory
108 Interface
110 Display
112 Geospatial Data Processing Unit
114 Boundary Determination Unit
116 Geo ID Code Generation Unit
118 Geo ID Code Processing Unit
120 Geo ID Code Storage
124 User Device
126 Processor
128 Memory
130 User Interface
132 Display
134 Geospatial Data Storage
136 Network
200 Process
202 Footprint
204 Centroid
206 Boundary
208 Longest Side of the Boundary
210 Reference Plane
212 Geo ID Code 214 OLC Code of Centroid
216 Directional Extents
218 Rotation Angle
300 Process
302 Geo ID Code
304 OLC Code of Centroid
306 Directional Extents
308 Rotation Angle
310 Centroid
312 Boundary
314 Reference Plane
400 Method
402 Step 1
404 Step 2
406 Step 3
408 Step 4
410 Step 5
412 Step 6
414 Step 7
416 Step 8
418 Step 9

The invention claimed is:

1. A geospatial digital encoding, decoding, and mapping system for processing geospatial data to generate a unique geo identification (ID) code for a geospatial object distinctively identifying the geospatial object and for decoding and mapping the unique geo code to a digital representation, the system comprising:

a geospatial data processing unit configured to:

capture the geospatial data associated with the geospatial object, the geospatial data being captured from disparate sources at least comprising photogrammetry-based sources using manned and/or unmanned aerial vehicles and/or terrestrial vehicle mounted mobile mapping systems and/or light detection and ranging (LIDAR) and/or radio detection and ranging (RADAR) interferometry and/or satellite-based remote sensing and/or mobile phone sensors, and extract a footprint of the geospatial object based on the geospatial data, the footprint of the geospatial object providing a ground-centered representation of location, shape, dimensions, and area of the geospatial object, a boundary determination unit configured to:

identify a centroid of the footprint of the geospatial object with respect to a reference plane, the centroid identifying a geo location of the geospatial object, and determine a boundary for the footprint of the geospatial object based on the centroid of the footprint such that the boundary captures the footprint of the geospatial object, generate an OLC code for the centroid of the footprint of the geospatial object by converting the centroid into in an OLC reference cell, wherein latitude and longitude of the centroid are converted into the OLC reference cell, and a geo ID code generation unit or geospatial data encoder configured to:

determine an orientation of the boundary with respect to a longest side of the boundary, rotate the boundary around the centroid of the footprint of the geospatial object along the longest side of the boundary, generate directional extents of the boundary based on the centroid of the footprint of the geospatial object, and generate the unique geo ID code for the geospatial object based on the computed directional extents, the centroid of the footprint of the geospatial object, and the orientation of the boundary by generating the geo ID code as a sequence of symbols, consisting of the OLC code of the centroid followed by the directional extents and the angle at which the boundary for the footprint is oriented along the longest side of the boundary with reference to the reference plane encoding the geospatial object into the geo ID code.

2. The geospatial digital encoding, decoding, and mapping system according to claim 1, further comprising a digital geo ID decoder configured to decode a received geo ID, wherein the geo ID is received as an input, and the geo ID is validated and the digital representation is generated digitally representing an originally encoded geospatial object.

3. The geospatial digital encoding, decoding, and mapping system according to claim 2, wherein the digital representation is a rotated two or three dimensional polygon.

4. The geospatial digital encoding, decoding, and mapping system according to claim 3, wherein the rotated polygon is a rotated digital rectangle.

5. The geospatial digital encoding, decoding, and mapping system according to claim 2, wherein the system is configured to generate, by matching, one to one, one to many, or many to many pairs of geo IDs from geo-data of an associated geo-database of the system.

6. The geospatial digital encoding, decoding, and mapping system according to claim 5, wherein the geo-data of the associated geo-database does not include the original geospatial object.

7. The geospatial digital encoding, decoding, and mapping system according to claim 5, wherein the matching is based at least on two parameters, a first parameter is generated based on an intersection over union of two given geometries as a measured area of overlap of the two given geometries divided by a measured area of union of the two given geometries, and a second parameter is generated based on an intersection over area of smaller areas as a measured area of overlap of the smaller area divided by a minimum of the smaller areas.

8. The geospatial digital encoding, decoding, and mapping system according to claim 7, wherein the matching is processed by a linear structure linking the first parameter and the second parameter, and a defined threshold is set between matched/unmatched pairs of datasets.

9. The geospatial digital encoding, decoding, and mapping system according to claim 8, wherein thresholds of matching are finetuned based on technical requirements at least comprising precision or recall.

10. The geospatial digital encoding, decoding, and mapping system according to claim 5, wherein an additional machine learning structure is applied to improve performance of the mapping.

11. The geospatial digital encoding, decoding, and mapping system according to claim 10, wherein the additional machine learning structure includes additional feature parameter values at least comprising a parameter value representing a distance between a centroid of two pair of geometries.

12. The geospatial digital encoding, decoding, and mapping system according to claim 1, wherein the system is configured to create, by decoding, a best rotated rectangle for a geo ID, the geo ID is transmitted by a client system to the system, and the system returns a geospatial object representing the best rotated rectangle.

13. The geospatial digital encoding, decoding, and mapping system according to claim 1, wherein an accuracy of the unique geo ID code is automatically tuned and/or adapted for different technical applications, and the different technical applications at least include for smaller objects requiring higher accuracy and/or for larger objects requiring lower accuracy.

14. The geospatial digital encoding, decoding, and mapping system according to claim 1, wherein geo IDs received from different, heterogenous systems are matched by the system.

15. The geospatial digital encoding, decoding, and mapping system according to claim 12, wherein the boundary determined for the footprint is the best rotated rectangle.

16. The geospatial digital encoding, decoding, and mapping system according to claim 1, wherein the geospatial object includes at least a building and/or a land structure and/or an equipment and/or an infrastructure.

17. The geospatial digital encoding, decoding, and mapping system according to claim 16, wherein the infrastructure at least includes a bridge and/or substations.

18. The geospatial digital encoding, decoding, and mapping system according to claim 1, wherein the geospatial data processing unit is configured to:

obtain the geospatial data from a geospatial data storage, and trigger data-capturing of the geospatial data upon a received user request.

19. The geospatial digital encoding, decoding, and mapping system according to claim 1, wherein the geo ID code generation unit is configured to calculate the directional extents with respect to sides of the boundary and based on the centroid of the footprint of the geospatial object.

20. The geospatial digital encoding, decoding, and mapping system according to claim 1, wherein the directional extents include north, south, east, and west extents or any other directional segmentation.

21. The geospatial digital encoding, decoding, and mapping system according to claim 1, wherein the boundary is oriented at an angle between 0 degrees to 180 degrees relative to the longest side of the boundary and with reference to the reference plane.

22. The geospatial digital encoding, decoding, and mapping system according to claim 1, wherein, the unique geo ID code includes a sequence of symbols.

23. The geospatial digital encoding, decoding, and mapping system according to claim 1, wherein the geo ID code generation unit is configured to store the unique geo ID code for the geospatial object in a geo ID code storage.

24. The geospatial digital encoding, decoding, and mapping system according to claim 1, further comprising a display configured to provide a location of the geospatial object in response to receiving the unique geo ID code.

25. The geospatial digital encoding, decoding, and mapping system according to claim 1, further comprising a geo ID code processing unit configured to process the unique geo ID code to identify a location of the geospatial object.

26. The geospatial digital encoding, decoding, and mapping system according to claim 1, further comprising a display configured to provide the digital representation of the geospatial object in response to receiving the unique geo ID code.

27. A method for generating a unique geo identification (ID) code for a geospatial object to distinctively identify the geospatial object, the unique geo ID code to be input in a user device to obtain details of the geospatial object, the method comprising:

obtaining, by a geospatial data processing unit, the geospatial data associated with the geospatial object, the geospatial data being captured from disparate sources at least comprising photogrammetry-based sources using manned and/or unmanned aerial vehicles and/or terrestrial vehicle mounted mobile mapping systems and/or light detection and ranging (LIDAR) and/or radio detection and ranging (RADAR) interferometry and/or satellite-based remote sensing and/or mobile phone sensors;

extracting, by the geospatial data processing unit, a footprint of the geospatial object based on the geospatial data the footprint of the geospatial object providing a ground-centered representation of location, shape, dimensions, and area of the geospatial object;

identifying, by a boundary determination unit, a centroid of the footprint of the geospatial object with respect to a reference plane, the centroid identifying a geo location of the geospatial object;

determining, by the boundary determination unit, a boundary for the footprint of the geospatial object based on the centroid of the footprint such that the boundary captures the footprint of the geospatial object;

generating an OLC code for the centroid of the footprint of the geospatial object by converting the centroid into in an OLC reference cell, wherein latitude and longitude of the centroid are converted into the OLC reference cell;

determining, by a geo ID code generation unit, an orientation of the boundary with respect to a longest side of the boundary or a shortest side of the boundary or any other detectable orientation of the footprint;

rotating, by the geo ID code generation unit, the boundary around the centroid of the footprint of the geospatial object along the longest side of the boundary:

generating, by the geo ID code generation unit, directional extents of the boundary based on the centroid of the footprint of the geospatial object;

generating, by the geo ID code generation unit, the unique geo ID code for the geospatial object based on the computed directional extents, the centroid of the footprint of the geospatial object, and the orientation of the boundary by generating the geo ID code as a sequence of symbols, consisting of the OLC code of the centroid followed by the directional extents and the angle at which the boundary for the footprint is oriented along the longest side of the boundary with reference to the reference plane encoding the geospatial object into the geo ID code; and displaying, by a display, the unique geo ID code for the geospatial object to a user.

28. The method according to claim 27, further comprising obtaining, by the geospatial data processing unit, the geospatial data from a geospatial data storage.

29. The method according to claim 27, further comprising processing, by the geospatial data processing unit, the footprint of the geospatial object to eliminate undesired data.

30. The method according to claim 27, further comprising storing, by the geo ID code generation unit, the unique geo ID code for the geospatial object in a geo ID code storage.

31. The method according to claim 27, wherein the unique geo ID code includes a sequence of symbols.

\* \* \* \* \*